United States Patent
Upadhyay et al.

(10) Patent No.: US 8,909,261 B1
(45) Date of Patent: Dec. 9, 2014

(54) DYNAMIC DETERMINATION OF FILE TRANSMISSION CHUNK SIZE FOR EFFICIENT MEDIA UPLOAD

(75) Inventors: Piyush Upadhyay, Overland Park, KS (US); William James Routt, Leawood, KS (US); John Chandler Witzgall, Overland Park, KS (US); Debashis Haldar, Olathe, KS (US); Jennifer D'Souza, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1103 days.

(21) Appl. No.: 12/336,156

(22) Filed: Dec. 16, 2008

(51) Int. Cl.
*H04W 4/00* (2009.01)

(52) U.S. Cl.
USPC ............... 455/466; 455/3.01; 455/414.1

(58) Field of Classification Search
CPC ... H04L 1/0002; H04L 47/12; H04L 47/2416; H04L 47/263; H04L 1/0026; H04L 65/80; H04L 69/40; H04W 28/14; H04W 12/06; H04W 88/005
USPC ............ 455/466, 3.05, 67.11, 433, 277.1, 455/412.1–414.4, 418–420, 3.01–3.06; 370/310, 332, 348, 447, 468, 462, 370/395.52, 537; 379/88.3, 88.13; 704/208
See application file for complete search history.

(56) References Cited

U.S. PATENT DOCUMENTS

| | | | | |
|---|---|---|---|---|
| 5,894,506 A * | 4/1999 | Pinter | | 379/88.23 |
| 6,108,530 A * | 8/2000 | Ayabe et al. | | 455/403 |
| 6,141,550 A * | 10/2000 | Ayabe et al. | | 455/433 |
| 6,597,918 B1 * | 7/2003 | Kim | | 455/466 |
| 6,956,832 B1 * | 10/2005 | Muhonen et al. | | 370/310 |
| 6,985,437 B1 * | 1/2006 | Vogel | | 370/230 |
| 6,996,393 B2 * | 2/2006 | Pyhälammi et al. | | 455/412.1 |
| 7,546,103 B1 * | 6/2009 | Kopikare et al. | | 455/277.1 |
| 7,813,484 B2 * | 10/2010 | Jackson et al. | | 379/88.13 |
| 8,547,907 B2 * | 10/2013 | Pelton et al. | | 370/328 |
| 8,713,075 B1 * | 4/2014 | Upadhyay et al. | | 707/809 |
| 2005/0054287 A1 * | 3/2005 | Kim | | 455/3.05 |
| 2005/0143979 A1 * | 6/2005 | Lee et al. | | 704/208 |
| 2006/0018257 A1 * | 1/2006 | Seo | | 370/232 |
| 2006/0171310 A1 * | 8/2006 | Ahluwalia et al. | | 370/229 |
| 2009/0047927 A1 * | 2/2009 | Weiler | | 455/405 |
| 2010/0054512 A1 * | 3/2010 | Solum | | 381/315 |
| 2011/0165899 A1 * | 7/2011 | Wright | | 455/466 |

* cited by examiner

*Primary Examiner* — Sharad Rampuria (57) ABSTRACT

A wireless communications device dynamically determines a number of wireless network parameters prior to data transfer to increase network efficiency and decrease delays during the transmission of a multimedia messaging service message. Before sending a multimedia messaging service message, a number of wireless network parameters are dynamically determined by the wireless communications device. Based upon these determined wireless network parameters, the wireless communications device determines an optimal file transmission size. The multimedia messaging service message may then be divided into one or more file chunks having a file size equal to the optimal file transmission size by the wireless communications device. The file chunks are transmitted by the wireless communication device to another wireless user.

20 Claims, 5 Drawing Sheets

DYNAMIC DETERMINATION OF FILE TRANSMISSION CHUNK SIZE FOR EFFICIENT MEDIA UPLOAD

Traditionally, multimedia messaging service messages are transmitted over a wireless network as one entire message, regardless of the size of the message or the quality of a wireless communications link. This implementation is inefficient and may result transmission errors and unnecessary delays.

SUMMARY

Embodiments of the invention are defined by the claims below. Embodiments of the invention provide methods and systems for dynamically determining an optimal file transmission size for a file transfer. The embodiments of the invention have several practical applications in the technical arts including decreasing multimedia transmission times for wireless users; decreasing network overhead for service providers; and providing a decentralized transmission management system that dynamically determines an optimal file transmission size.

In one embodiment, one or more tangible computer-readable media having computer-usable instructions embodied thereon for transmitting a file over a wireless network is provided. A wireless communications device receives a request to transmit the file over the wireless network. The wireless communications device determines at least one network parameter of the wireless network. The wireless communications device determines an optimal file transmission size based on the determined at least one network parameter of the wireless network. The wireless communications device divides the file into file chunks having a file size equal to the optimal file transmission size. The wireless communications device transmits the file chunks over the wireless network. The wireless communications device also receives an acknowledgement message over the wireless network.

In another embodiment, one or more tangible computer-readable media having computer-useable instructions embodied thereon for performing a method to dynamically determine a number of network parameters is provided. A wireless communications device receives a request to transmit a multimedia messaging service message over a wireless data network from a wireless communications device. The method also includes determining the plurality of wireless network parameters. The plurality of wireless network parameters are determined by the wireless communications device. The wireless communications device determines an optimal transmission size based on the determined plurality of wireless network parameters. The wireless communications device transmits the multimedia messaging service message over the wireless data network.

In yet another embodiment, a wireless communications device is provided. The wireless communications device includes a processor. The wireless communications device also includes a storage component that stores a file. The wireless communications device further includes a set of computer-useable instructions embodied in the storage component that, when executed by the processor, provides for a determination of an optimal data transmission chunk size based upon a number of dynamically determined wireless network parameters. The wireless communications device still further includes a transmitting component that transmits the file in chunks having chunk sizes over a wireless data network. The chunk sizes being equal to the determined optimal data transmission chunk size.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Embodiments of the invention provide systems and methods for determining an optimal file transmission size for transferring a file over a wireless network. The optimal file transmission size may, in whole or in part, be determined in response to various network parameters, such as, for example, signal to noise ratio, a transmission control protocol retransmission rate, or a packet error rate. Embodiments of the invention may include systems and methods that divide a file to be transferred into one or more file "chunks" each having a file size equal to the dynamically determined optimal file size. In some embodiments, the systems and methods transmit the file chunks to a destination.

As one skilled in the art will appreciate, embodiments of the invention include, among other things: a method, a wireless communications device, a wireless system, and a computer-program product. Accordingly, the embodiments may take the form of a hardware embodiment, a software embodiment, or an embodiment combining software and hardware. In one embodiment, the computer-program product includes computer-useable instructions embodied on one or more computer-readable media having logic for dynamically determining an optimal file transmission size.

Computer-readable storage media include both volatile and nonvolatile media, removable and nonremovable media, and contemplates media readable by a database, a switch, and various other network resources. Network switches, routers, firewalls, and related components are conventional in nature, as are means of communicating with the same. By way of example, and not limitation, computer-readable media may comprise computer-readable storage media or communications media.

Computer-readable storage media, or machine-readable media, include media implemented in any method or technology for storing information. Examples of stored information include computer-useable instructions, data structures, program modules, and other data representations. Computer-readable storage media include, but are not limited to random access memory ("RAM"), read-only memory ("ROM"), electrically erasable programmable read-only memory ("EEPROM"), flash memory or other memory technology, compact disc read-only memory ("CD-ROM"), digital versatile discs (DVD), holographic media or other optical disc storage, magnetic cassettes, magnetic tape, magnetic disk storage, and other magnetic storage devices. These memory components can store data momentarily, temporarily, or permanently.

Illustrative Operating Environment

Figure 1:
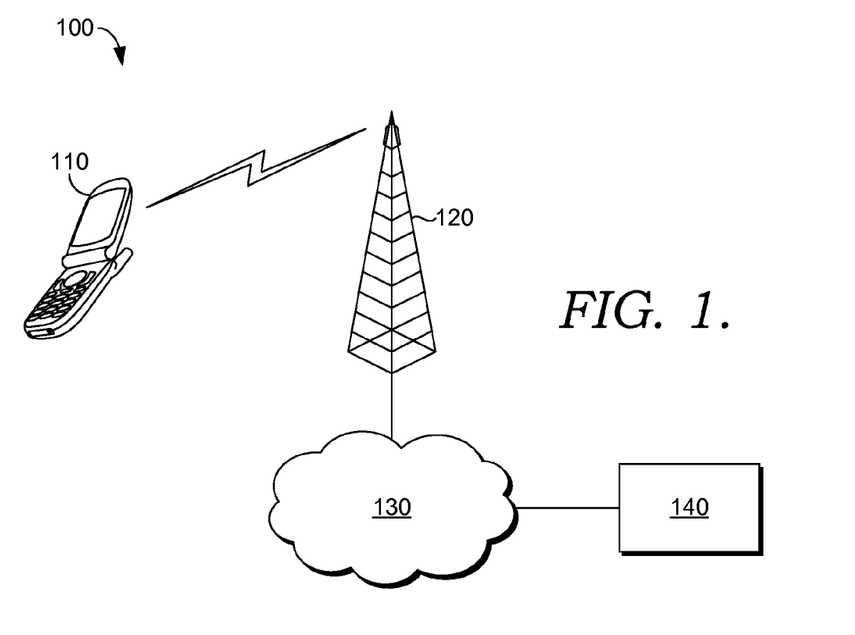
FIG. 1 is an exemplary network diagram that illustrates a wireless network, in accordance with embodiments of the invention.

Embodiments of the invention may be practiced in a communications network providing service to wireless devices. FIG. 1 illustrates an exemplary wireless network in accordance with embodiments of the invention. An illustrative operating environment 100 that contains a few of the components within such a communication network is shown in FIG. 1. The components shown in FIG. 1 are just some of the components that embodiments of the invention may interact with during operation. The components within FIG. 1 are communicatively coupled to each other in a manner appropriate for carrying out their respective functions within the illustrative operating environment 100. Embodiments of the invention are not limited by the communication protocols or formats used to facilitate communication between components.

Illustrative operating environment 100 includes wireless communications device 110, base station 120, wireless network 130, and a multimedia messaging service center ("MMSC") 140. Illustrative operating environment 100 is merely an example of one suitable environment and is not intended to suggest any limitation as to the scope of use or functionality of embodiments of the invention. Neither should illustrative operating environment 100 be interpreted as having any dependency or requirement related to any single component or combination of components illustrated therein. For example, embodiments of the invention may be practiced in an environment that does not include a multimedia messaging service center. In this environment, any manner of transmitting a multimedia messaging service ("MMS") message is contemplated, such as, for example, direct communication between wireless users.

Wireless communications device 110 is a wireless terminal that is adapted to receive communications and/or media over the wireless network included in illustrative operating environment 100. For example, wireless communications device 110 may access content over the Internet. Some lower-level details of wireless communications device 110 are not shown so as to not obscure embodiments of the invention. For instance, wireless communications device 110 may include a bus that directly or indirectly couples the following devices: memory, one or more processors, one or more presentation components such as a display or speaker, input/output (I/O) ports, I/O components, and a power supply such as a battery. The display device is suitable for viewing media content such as movies, videos, video calls, or television shows. An LCD screen is one example of a display that might be used on the wireless communications device 110. Wireless communications device 110 may communicate with base station 120 via wireless protocols, such as code division multiple access ("CDMA"), global system for mobile communications ("GSM"), or time division multiple access ("TDMA"), as well as others.

Wireless communications device 110 may include any device configured for wireless communication. By way of example, wireless communications device 110 may be a wireless telephone, smart phone, pager, computing device, personal digital assistant ("PDA") or any combination of these or other devices. In one embodiment, wireless communications device 110 has the ability to capture or display one or more forms of media content. Examples of media content include photographs, videos, audio, television shows, movies, MPEP-1 Audio Layer 3 ("MP3") files, MPEG-4 files, and radio programs. Of course, this list is not exhaustive. The media may be displayed by the wireless communications device 110 as it is received from the wireless network 130 or from memory within wireless communications device 110. For example, wireless communications device 110 may include one or more multimedia capturing components that capture multimedia content to store within a storage component of the wireless communications device. The multimedia capturing components are varied, and may include, for example, an image capturing component, a video capturing component, an audio capturing component, or the like. Wireless communications device 110 may also be capable of receiving one or more of phone calls, video calls, text messages, MMS messages, emails, calendar updates, task reminders, or the like.

Base station 120 is a fixed station used for communicating with wireless communications device 110. Standard air interface protocols, such as CDMA, GSM, or TDMA, as well as others, may be used by base station 120 to communicate with wireless communications device 110. Other network communication interface arrangements are also possible. A base station controller (not shown) is responsible for handling traffic and signaling with wireless communications device 110. In the illustrative operating environment 100 of FIG. 1, base station 120 is the only base station shown for the sake of clarity. Of course, any number of base stations are contemplated as included with various embodiments of the invention.

Wireless network 130 is a wide area network ("WAN") and may include one or more wireless networks, one or more packet based networks, including the Internet, or the public switched telephone network ("PSTN"). The various components within wireless network 130 may be owned or operated by multiple entities, commercial or otherwise. Wireless network 130 is configured to transmit a variety of communication formats including phone calls, emails, text messaging, faxes, instant messaging, pages, voice mails, photographs, audio files, movies, TV shows, calendar reminders, task reminders, and other files containing communicative content. In one embodiment, wireless network 130 is a wireless data network of a wireless service provider.

Multimedia messaging service center ("MMSC") 140 helps direct MMS messages between users. When a user of wireless communications device 110 sends a multimedia message to another user, the message may be stored in MMSC 140, which may deliver the multimedia message to a destination user when the destination user becomes available. In this capacity, MMSC 140 may operate in a store-and-forward manner. Alternatively, MMSC 140 may simply operate to communicate a transmission across one or more networks or across one or more communication mediums. In other embodiments, MMSC 140 may simply include a server or other computing device that assists in delivering MMS messages between users. In other embodiments, MMSC 140 may include a stand alone structure dedicated to transmitting MMS messages across the wireless network 130. In still other embodiments, MMSC 140 may be omitted, such as, for example, where two or more wireless communications devices communicate directly with one another or through one or more intermediary base stations.

Multimedia messaging service messages generally include messages originating from a wireless communications device 110 that are transmitted to and destined for at least one other wireless communications device (not shown). In other embodiments, MMS messages may include messages originating from a wireless communications device 110 that is transmitted to and destined for at least one computing device (e.g., a computer) connected to a network (e.g., the Internet). In another embodiment, MMS messages are transmitted over a data network designed to transmit or communication multimedia content. In other embodiments, the MMS message may, in whole or in part, be transmitted over a voice network of a wireless provider. Of course, this depends on a myriad of factors, including the sophistication of the data network, the sophistication of the voice network, the size of the file, the location of the destination device, or the like. A defining feature of an MMS message is the content included within the message itself. Multimedia messages therefore generally include, for example, messages with associated images, audio, video, rich text, or the like. For example, MMS messages include messages containing a digital photograph, a digital video, and/or an audio file. Of course, embodiments of the invention need no be so limited, as any other data transmitted from a wireless device (e.g., text messages) may optionally employ embodiments of the invention.

One of ordinary skill in the art appreciates and understands that illustrative operating environment 100 has been simplified to facilitate a clear description of embodiments of the invention. Also, one or ordinary skill in the art appreciates and understands that alternate arrangements are within the scope and spirit of this description.

Figure 2:
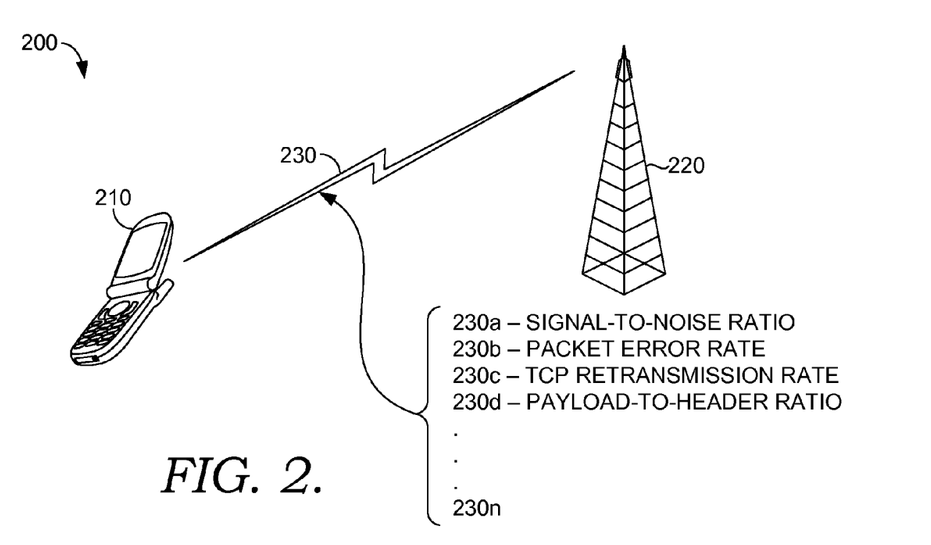
FIG. 2 is an exemplary wireless communications link between a wireless communications device and a base station, in accordance with embodiments of the invention.

FIG. 2 is an exemplary wireless communications link between a wireless communications device and a base station, in accordance with embodiments of the invention. As previously detailed, embodiments of the invention include a wireless communications device 210 and a base station 220. The wireless communications device 210 is in wireless communication with base station 220. The wireless communication is facilitated via a wireless communications link 230. The ability of the wireless communications device 210 to transmit a file over the wireless network depends, in whole or in part, on a variety of exemplary wireless network parameters 230a, 230b, 230c, 230d, etc., each affecting the quality of the wireless communications link 230. For example, an exemplary wireless network parameter may include a signal to noise ratio ("SNR") 230a of the wireless network. In general, SNR 230a represents the power ratio between a signal (e.g., desired information) and the background noise (e.g., static). As is known in the art, the greater the ratio of background noise relative to the signal, the more likely it is that some meaningful information will be lost or compromised during transmission. Another exemplary wireless network parameter includes a packet error rate ("PER") 230b. In general, a PER is a rate or ratio of the packets successfully received by a receiving component measured against the actual number of packets transmitted. Yet another exemplary network parameter includes a transmission control protocol ("TCP") retransmission rate 230c for the wireless network. In general, this exemplary wireless network parameter represents the number of packets that the network recognizes as being retransmitted. Wireless network parameters may include other parameters, such as, for example, a desired or minimum payload to header ratio 230d, which generally measures the amount of payload transmitted against the amount of header information required to transmit the payload. Of course, any wireless network parameter capable of affecting the quality of wireless communications link 230 or the transmission capacity of wireless communications link 230 is contemplated by embodiments of the invention. As such, various embodiments of the invention include numerous additional wireless network parameters without departing from the scope or spirit of embodiments of the invention.

Depending on the values of the wireless network parameters 230a, 230b, 230c, 230d, each potentially affecting the quality of wireless communications link 230, wireless communications link 230 may not be capable of supporting a multimedia file transfer at any given moment. Alternatively, the wireless communications link 230 may not be capable of supporting a partial multimedia file transfer at any given moment. For example, the wireless network might be capable of supporting a 50 kilobyte file transfer with a high probability of success (e.g., 99% success rate), while being unable to support a 500 kilobyte transfer with any degree of confidence (e.g., 99% failure rate). As such, in this hypothetical example, attempting to transfer an entire 500 kilobyte file in one transmission would be essentially futile, and could potentially waste time and network resources.

Figure 3:
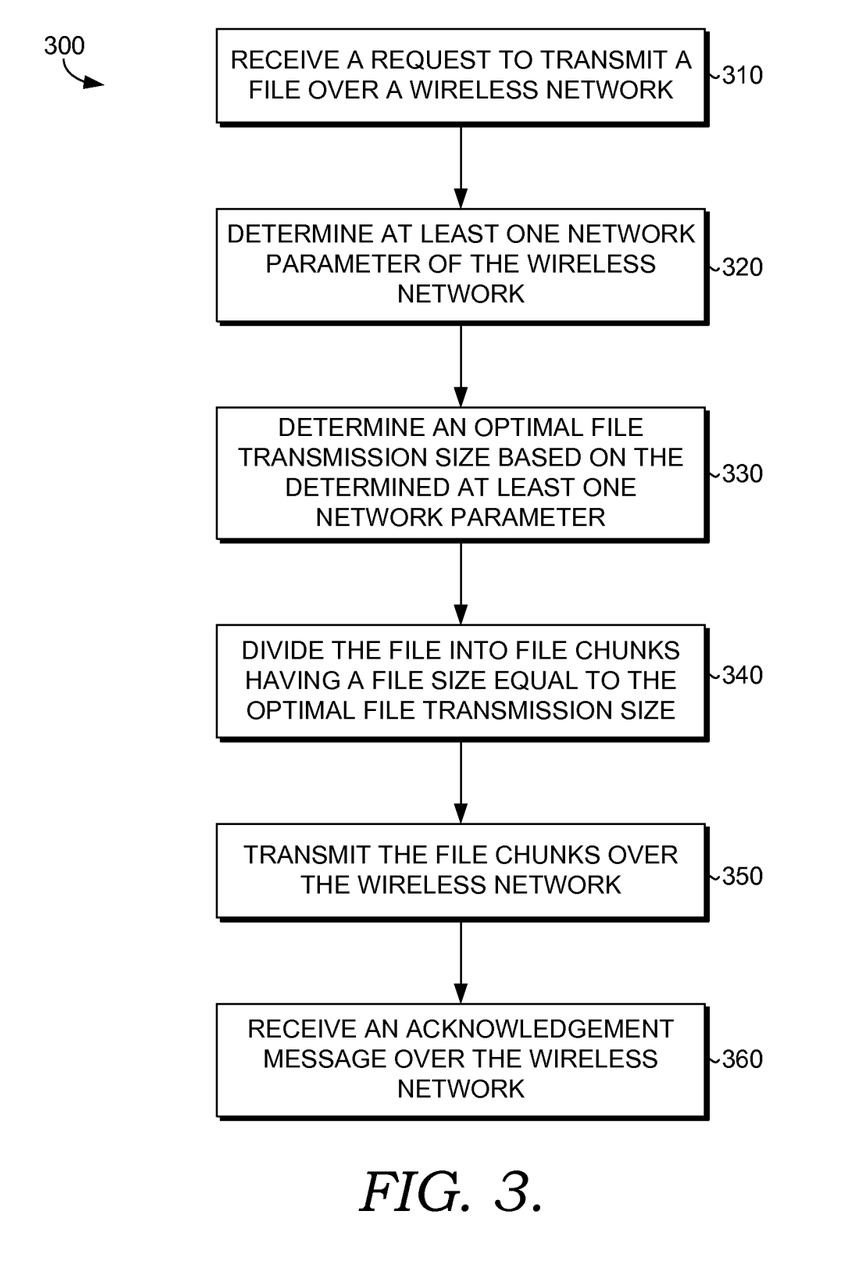
FIG. 3 is an exemplary logic diagram that illustrates a computer-implemented method for transmitting a file over a wireless network, in accordance with an embodiment of the invention.

FIG. 3 is an exemplary logic diagram that illustrates a computer-implemented method for transmitting a file over a wireless network, in accordance with an embodiment of the invention. At block 310, a request to transmit a file over a wireless network is received. In some embodiments, the wireless network comprises a data network. The data network is configured to transmit various multimedia files to one or more destination users (e.g., other wireless communications devices, a computer, or the like). In other embodiments, the file is an MMS message, such as, for example, a message to transmit an image, video, or audio file. The MMS message may optionally include or exclude a corresponding textual message. In other embodiments, the request to transmit the file over the wireless network is initiated on a wireless communications device.

In one embodiment, the request received at block 310 is a request to transmit a file captured by a wireless communications device utilizing one or more multimedia capturing components. For example, the request received at block 310 may include a request to send a video captured by a user of a wireless phone. In this example, the user of the wireless phone captures multimedia in any known manner (e.g., uses a camcorder integrated into the wireless phone). After capturing the multimedia, the user can select an option on the wireless communications device or wireless phone to transmit the file to another wireless communications device, wireless phone, computer, or the like.

In an alternative embodiment, the request received at block 310 is a request to transmit a multimedia file not captured by the wireless communications device. In this embodiment, the source of the multimedia is simply irrelevant to practicing various embodiments of the invention. For example, the request at block 310 may represent a request to transmit a file that came originally installed on the wireless communications device by the device manufacturer (e.g., an originally installed photograph, MMS template, etc.). Alternatively, the request at block 310 may represent a request to transmit a file that was previously transmitted to the user. For example, the request at 310 may include a request to forward a received photograph to a friend.

At block 320, at least one wireless network parameters 230a, 230b, 230c, 230d of the wireless network is determined. As previously detailed, wireless network parameters include, for example, a signal to noise ratio 230a, a packet error rate 230b, a rate of TCP retransmissions rate 230c, or the like. In some embodiments, multiple wireless network parameters are determined. For example, in one embodiment, the signal to noise ratio 230a, the packet error rate 230b, and the TCP retransmissions rate 230c are each determined. In other embodiments, only one wireless network parameter is determined. In an alternative embodiment, the wireless communication device that receives the request at block 310 dynamically determines the wireless network parameters (i.e., which may optionally be one or several network parameters) only after receiving the request to transmit a file. For instance, in one embodiment, a user of a wireless communications device (e.g., a wireless phone) drafts and sends a multimedia message that includes an embedded image or video. In this example and embodiment, the wireless communications device determines the various wireless network parameters after receiving the request to transmit the file (e.g., when the user hits send). In another embodiment, the wireless communications device determines the wireless network parameters on a predefined schedule (e.g., once a minute, once an hour, once a day, once a week, or the like) or in response to some predefined act (e.g., launching an application to draft a multimedia message, launching a multimedia component, or the like). In this regard, the wireless communications device may optionally determine various wireless network parameters dynamically. The determination may occur on an as-needed basis (e.g., before the transmission of a file, during the transmission of a file, both before and during the transmission of a file) or on any desired schedule. Further, embodiments of the invention include a wireless communication device that dynamically determines the status of the various wireless network parameters.

Referring again to FIG. 3, at block 330, an optimal file transmission size based upon at least one wireless network parameter is determined (or calculated, if applicable). In one embodiment, the transmitting wireless communications device determines the optimal file transmission size. In some embodiments, block 330 may include various known or observed network statistics. For example, for a given network, it may be known that the highest probability of message throughput associated with a PER of 3.7% is 72 kilobytes. That is, when the PER rate is 3.7%, messages smaller and larger than 72 kilobytes are less likely to be successfully transmitted across the network. In this example, assuming a determined PER is 3.7%, block 330 may include determining that the optimal file transmission size is 72 kilobytes. In one embodiment, the optimal file transmission size is determined, at least in part, based upon a payload-to-header ratio. The payload-to-header ratio may be optionally included to prevent selecting an optimal file transmission size that is too small to effectively utilize network resources (e.g., dividing a 100 kilobyte file into 400 file chunks each having 1 kilobyte of control/header data may ineffectively utilize network resources by quadrupling the overall amount of data to be transmitted). Of course, any other factor that could increase the efficiency of media transfer is contemplated as part determining the optimal file transmission size.

Further, in practice, several wireless network parameters may be determined at block 320. This, of course, may result in several conflicting optimal file sizes. As such, in some embodiments, block 330 includes a ranking algorithm to assign each wireless network parameter a relative importance in determining the optimal file transmission size. The weight given to each determined wireless network parameter may depend, at least in part, on the ranking algorithm. For example, if the most significant wireless network parameter is generally the PER (i.e., the PER has the greatest effect on file transfer), that wireless network parameter may be given the greatest weight in determining the optimal file transmission size. The ranking algorithm can be based off known network heuristics, mathematical models, collected network statistics, or the like. In other embodiments, the optimal file transmission size is the smallest file size for each wireless network parameter, while optionally considering the desired payload-to-header ratio for the file transmission. In this embodiment, for example, the SNR may define an optimal file transmission size of 100 kb, the PER may define an optimal file transmission rate of 75 kb, and the TCP retransmission rate may define an optimal file transmission size of 50 kb. In this embodiment and example, the determined optimal file size will be 50 kb.

In other embodiments of the invention, the wireless communications device collects and stores various network statistics into a data memory. For example, the wireless communications device may collect and store information regarding the success or failure of each MMS file transfer and optionally communicate this collected information over the wireless network to an interested party. This information may include, for example, information regarding the number of transmission attempts, total time to complete the transmission process, the size of the transmitted file, or the like. In fact, any information that could aid in determining an optimal file transmission size is contemplated as being within various embodiments of the invention. The interested party may be, for example, a wireless network operator, engineers, manufacturers of wireless communications devices, or the like. The collected and communicated information may then be optionally incorporated into future heuristics, network models, or network statistics for determining optimal file transmission sizes. In this regard, embodiments of the invention leverage the millions of media transfers that occur each year to revise the information used to determine the optimal file transmission size.

At block 340, the file to be transmitted is divided into file chunks having a file size equal to the optimal file transmission size. For example, a media file having a storage size of 300 kb can be divided by a wireless communications device into five 60 kilobyte chunks for transmission, assuming, of course, 60 kilobytes is the determined optimal file transmission size. The division process of block 340 optionally includes defining each chunk such that a receiving component can reassemble the divided file at the conclusion of the transmission process. For example, this may include the wireless communications device assigning each file chunk control information or a header such that a receiving component (e.g., another wireless communications device, an MMSC, a computer, or the like) can reassemble the file in the proper format or order. In another embodiment, the file chunks are transmitted by the wireless communications device immediately after division without being permanently stored on a transmitting wireless communications device. In another embodiment, the file chunks are locally stored in a storage component of the transmitting wireless communications device until the division process, the transmission process, or the reception process is complete. Of course, the file chunks need not be identical in size to the determined optimal file transmission chunk, where such division would be impractical or impossible. For example, it is impossible to divide a 100 kilobyte file into optimal file chunks of 40 kilobytes. As such, embodiments of the invention, as previously addressed, contemplate considering the size of the file being transmitted. In this example, embodiments of the invention may simply divide the file into three chunks, two being 40 kilobytes (the optimal file transmission size) and the third chunk containing the remainder of the information (likely slightly over 20 kilobytes to reflect control/header information of all three divided file chunks). Alternatively, embodiments of the invention may utilize the previously discussed ranking algorithm to select an alternative optimal file transmission size that more appropriately fits the size of the multimedia file.

In an alternative embodiment, the division process of block 340 includes a wireless communications device dividing the file to be transmitted into a file chunk having a file size equal to the optimal file transmission size. In this embodiment, the file chunk having a file size equal to the optimal file transmission size is transmitted by the wireless communications device (see block 350), and the method 300 is iteratively practiced until the entire MMS message has been transmitted. For example, a 600 kilobyte file could be divided into a 200 kilobyte file chunk based on a first number of network parameters. After the file chunk having a file size of 200 kilobytes is transmitted, the remaining 400 kb of data could be divided into additional chunks based on a second number of wireless network parameters determined after (or during) the transmission of the first file chunk. The additional chunks may have a different optimal file transmission size depending on the values of the determined second number of wireless network parameters. In this embodiment, the process is repeated until the entire MMS message has been transmitted (see Specific Example). In other embodiments, the invention may include determining a third, fourth, fifth, etc., number of wireless network parameters each being used to determine a third, fourth, fifth, etc., optimal file transmission sizes, respectively. In still other embodiments, each optimal file transmission size determined during each step of the iterative process of embodiments of the invention will be different (e.g., the second optimal file transmission size will be different than the first optimal file transmission size because the second number wireless network parameters will be different than the first number of wireless network parameters, and so on). In other embodiments, optimal file transmission sizes determined during each step of the iterative process of embodiments of the invention may be same, depending on the values of the determined wireless network parameters.

At block 350, the file chunks are transmitted over the wireless network. In general, the file chunks may be transmitted over the wireless network via any known process or method for transmitting data over a wireless communications link. In one embodiment, the file chunks are transmitted via a number of hypertext transfer protocol ("HTTP") POST requests. The number of HTTP POST request may, of course, vary with the size of the file being transmitted and the determined optimal transmission size. For example, if the media file is 1,000 kilobytes and the optimal file transmission size is 50 kilobytes, the transmission might utilize twenty HTTP POST requests to transmit the file. In alternative embodiments, the file chunks are transmitted via any other method of transmitting data over a wireless communications link. In still other embodiments of the invention, the file chunks are transmitted from a wireless communications device (e.g., a wireless phone) to an MMSC via one or more base stations. Of course, however, the file chunks can be sent to any device or component capable of receiving the transmission. In fact, in one embodiment, the media file is transmitted directly to the intended recipient device.

At block 360, an acknowledgement message is received over the wireless network. In one embodiment, the transmitting wireless communication device receives the acknowledgement message. The acknowledgement message may indicate, for example, that all the file chunks have been received by the MMSC or the intended recipient, that the file has been properly reassembled at a reception site (e.g., the MMSC), the length of the transfer, or any other information that may be useful in compiling a vast array of network statistics for future dynamic determinations of optimal file transmission sizes. In one embodiment, the transmitting wireless communications device stores the acknowledgement message and optionally communicates the information over the wireless network to an interested party. In other embodiments, no acknowledgment message is received over the wireless network.

Figure 4:
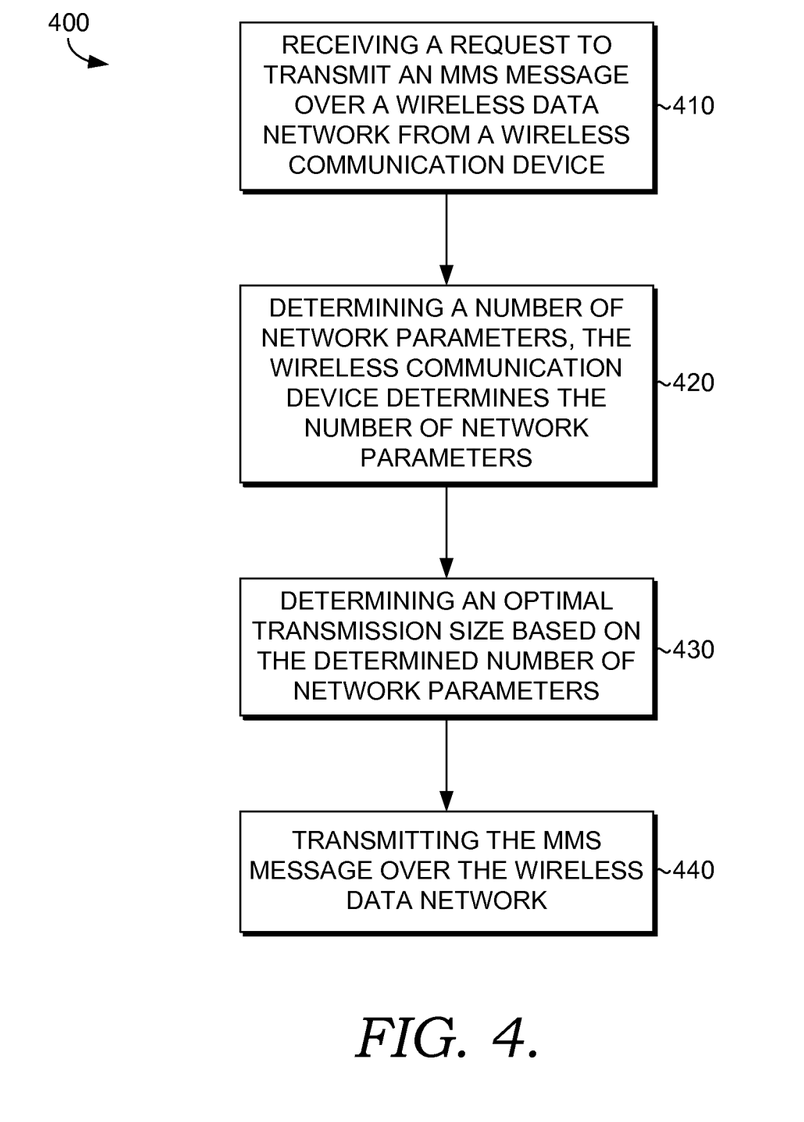
FIG. 4 is an exemplary logic diagram that illustrates a computer-implemented method for performing a method to dynamically determine a plurality of network parameters, in accordance with an embodiment of the invention.

FIG. 4 is an exemplary logic diagram that illustrates a computer-implemented method to dynamically determine a plurality of network parameters, in accordance with an embodiment of the invention. Method 400 may be performed by a wireless communications device, or other device, that is capable of generating or transmitting MMS messages over a wireless network. At block 410, a wireless communication device receives a request to transmit an MMS message over a wireless data network from a wireless user. In some embodiments, the wireless communications device includes a wireless phone optionally having a camera or other multimedia capturing component (e.g., microphone, camcorder, or the like). At block 420, the wireless communications device determines a number of wireless network parameters. Again, network parameters include, for example, a signal to noise ratio, a TCP retransmission rate, or a packet error rate. Other determined parameters may include, for example, a payload to header ratio, the size of the file to be transmitted, or the like. Any number of wireless network parameters may be selected by the wireless communications device. As would also be apparent to those having ordinary skill in the art, the wireless communications device need not actually determine the value of the wireless network parameters. On the contrary, any number of other components could optionally determine one or more of the wireless network parameters and still be within the scope of various embodiments of the invention, such as, for example, a base station, the MMSC, the service provider, or the like. In another embodiment, however, the determination of block 420 occurs on a wireless communications device. In this embodiment, the wireless communications device includes a set of computer-useable instructions embodied in a storage component of the wireless communications device that, when executed by a processor, provides for a determination of a number of network parameters.

At block 430, the wireless communications device determines an optimal file transmission size based on the determined number of wireless network parameters. As detailed with regard to method 300, block 430 may utilize various known or observed network statistics. In one embodiment, the determination of block 430 occurs on a wireless communications device. In this embodiment, the wireless communications device includes a set of computer-useable instructions embodied in a storage component of the wireless communications device that, when executed by a processor, provides for a determination of an optimal file transmission size based on the determined number of wireless network parameters.

At block 440, the wireless communications device transmits the MMS message over the wireless data network. Any known method for transmitting an MMS message is contemplated as part of the various embodiments of the invention. In one particular embodiment, the MMS message is transmitted over the wireless data network via one or more HTTP POST requests. However, of course, any manner of wirelessly transmitting information is contemplated as part of various embodiments of the invention.

Figure 5:
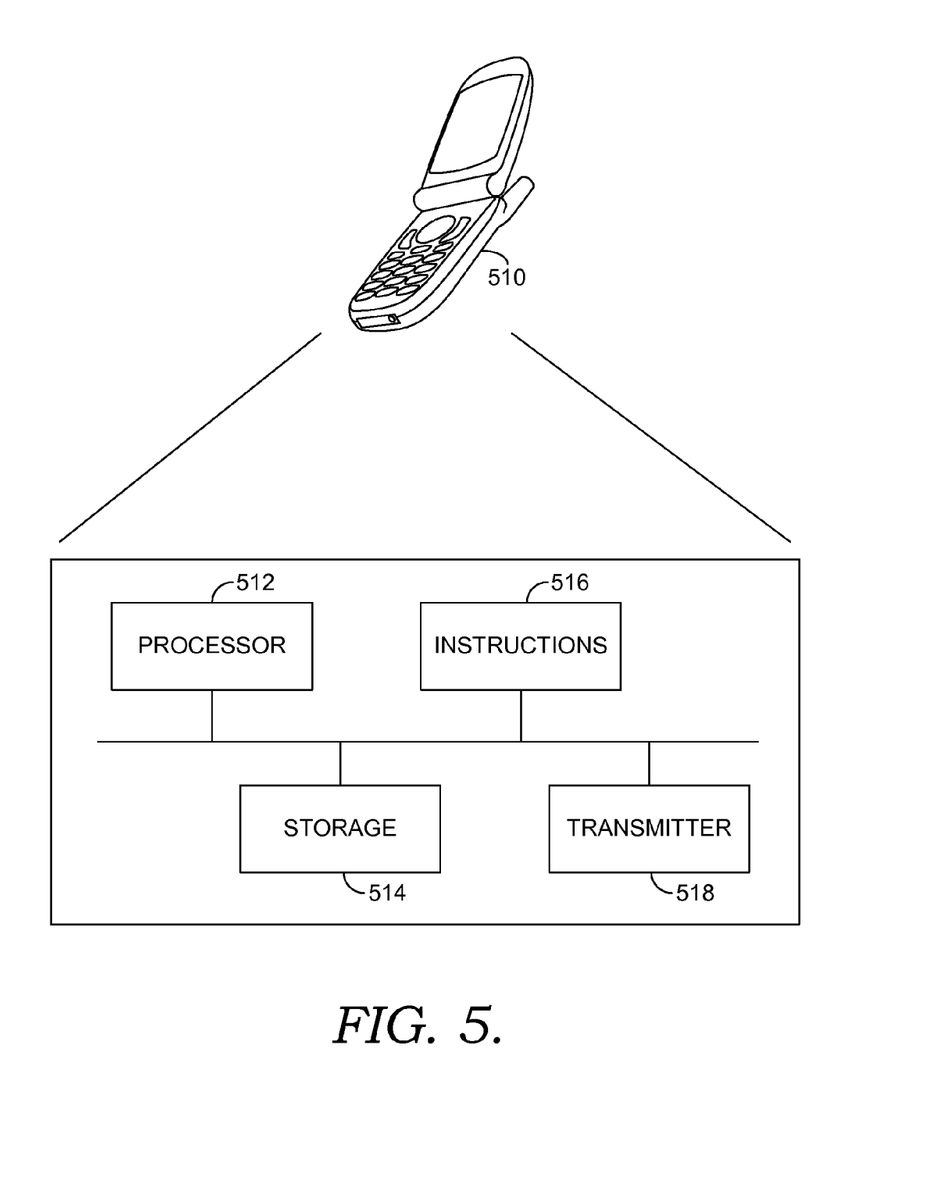
FIG. 5 is an exemplary wireless communications device that dynamically determines an optimal data transmission chunk size, in accordance with an embodiment of the invention.

Referring now to FIG. 5, a wireless communications device in accordance with an embodiment of the invention is disclosed. In certain embodiments, the wireless communications device 510 includes, at least, wireless phones, personal digital assistants, or any wireless computing device that communicates wirelessly over an access network. The wireless communications device 510 is configured to connect to a wireless network, such as, for example, a wireless data network. The wireless communications device 510 is configured to execute a set of computer-executable instructions to determine the optimal file transmission size of a file. In certain embodiments, the wireless communications device 510 includes a processor 512, a memory or data storage component 514, a set of computer-executable instructions 516 for performing various methods in accordance with one or more embodiments of the invention, and a transmitting component 518 configured to transmit data over a wireless network. In some embodiments, the memory or data storage component 514 is configured to store data or computer-executable instructions 516 for applications and algorithms executed by the processors. The computer-executable instructions 516 for performing various methods in accordance with one or more embodiments of the invention includes computer-executable instructions for determining a number of network parameters, determining an optimal file transmission size, dividing a file into at least one file chunk having an optimal file transmission size, transmitting a MMS message over a wireless network, or any other method in accordance with various embodiments of the invention. The transmitting component 518 includes any component is configured to transmit data over a wireless network, such as, for example, a radio component. In some embodiments, the transmitting component 518 is configured to transmit MMS messages over a wireless data network.

In alternative embodiments, wireless communications device 510 may include any number of other components. For example, in one embodiment, wireless communications device 510 includes a determining component for determining a plurality of wireless network parameters. In this embodiment, the plurality of wireless network parameters are dynamically determined by the wireless communications device. Exemplary determining components include, for example only, antennas, radios, or the like. In an alternative embodiment, wireless communications device 510 includes a multimedia capture component or device. Multimedia capture components include, for example, cameras, camcorders, microphones, or the like. In this embodiment, the wireless communications device 510 is configured to capture multimedia, such as, for example, digital photographs, digital videos, audio files, or the like.

One of ordinary skill in the art understands and appreciates that wireless communications device 510 has been greatly simplified. Alternate arrangements and configurations are available and within the scope and sprit of the Detailed Description.

Specific Example

As described above, examples of various embodiments of the invention may include systems, methods, and computer-readable media that dynamically determine the optimal file transmission size for transmitting a file or MMS message over a wireless network. The various features of embodiments of the invention have been described in relation to FIGS. 1-5, which are intended in all respects to be illustrative rather than restrictive. Alternative embodiments will become apparent to those of ordinary skill in the art to which the invention pertains without departing from its scope.

The following table provides an example of the dynamic determination of an optimal file transmission size that may be used in accordance with at least one embodiment of the invention. In the following example, the listed wireless network parameters were determined by the wireless communications device, in accordance with an embodiment of the invention. Of course, in other embodiments, determined wireless network parameters may be received by a wireless communications device in an alternative manner (e.g., over the air).

In this example, an MMS application tracks various wireless network parameters dynamically. Specifically, for this example, the tracked wireless network parameters include a signal to noise ratio and a TCP retransmission rate. Of course, in actual practice, any number of wireless network parameters may be tracked. For the sake of clarity, however, this example has been limited to two wireless network parameters. Additionally, the table included below is merely illustrative. Embodiments of the invention may use tables preloaded on a wireless communications device, tables intermittently sent over the air to a wireless communications device, algorithms or mathematical formula either preloaded or sent over the air to track the wireless network parameters. An exemplary table is now disclosed:

| TCP Retransmission Rate | Signal Strength (SNR) | | | | |
| --- | --- | --- | --- | --- | --- |
| | −70 to −75 dbm | −75 to −80 dbm | −80 to −85 dbm | −85 to −90 dbm | −90 dbm & above |
| <0.5% | 300 KB | 250 KB | 200 KB | 150 KB | 100 KB |
| 0.5% to 1% | 250 KB | 200 KB | 150 KB | 100 KB | 75 KB |
| 1% to 1.5% | 200 KB | 150 KB | 100 KB | 75 KB | 50 KB |
| >1.5% | 100 KB | 75 KB | 50 KB | 25 KB | 25 KB |

In this example, a user of a wireless communications device captures a multimedia file using any known multimedia capturing component. The captured multimedia file has a file size of 823 kilobytes. The user then desires to send the captured file to another user (e.g., another wireless communications device, a computer, or the like) and launches an application for creating and/or sending MMS messages. The MMS message is created and the user hits send. After the user hits send (as previously detailed, in some embodiments, the dynamic determination may occur before the user hits send, such as, for example, when the application for creating or sending MMS message is initiated), an MMS application executing in the wireless communication device determines the file size of the MMS message to send, the signal to noise ratio and the TCP retransmission rate. In this example, the MMS application may originally determine that the file size is 823 kb, the SNR value is −83 dbm, and the TCP retransmission rate is undefined (as this it the first chunk to send). In alternative embodiments, the TCP retransmission rate may be defined for the first chunk, being based upon other information, such as, for example, a recent file send, network averages, or the like. Based on these determinations, the MMS application may select an optimal file transmission size of 200 kb. The multimedia file is then divided into chunks, one chunk having a file size equal to the optimal file transmission size of 200 kb. The chunk having a file size equal to the optimal file transmission size of 200 kb is then transmitted over a wireless network. After the 200 kb file chunk is successfully transmitted (or during transmission of the 200 kb chunk), the MMS application determines the file size of the remaining MMS message to send (i.e., the file size of the remaining chunk), the signal to noise ratio and the TCP retransmission rate. In this example, the MMS application may determine that the remaining file size is 623 kb (823−200, assuming for simplicity that control/header information did not contribute to the transmitted chunk file size), the SNR value is −93 dbm, and the TCP retransmission rate is 0.6% (based off the previous file chunk transmission, network averages, or the like). Based on these determinations, the MMS application may select an optimal file transmission size of 75 kb. The multimedia file is then divided into chunks, one chunk having a file size equal to the optimal file transmission size of 75 kb. The chunk having a file size equal to the optimal file transmission size of 75 kb is then transmitted over a wireless network. After the 75 kb file chunk is successfully transmitted (or during transmission of the 75 kb chunk), the MMS application determines the file size of the remaining MMS message to send (i.e., the file size of the remaining chunk), the signal to noise ratio and the TCP retransmission rate. In this example, the MMS application may determine that the remaining file size is 548 kb (623-75, assuming again that control/header information did not contribute to the transmitted chunk file size), the SNR value is -73 dbm, and the TCP retransmission rate is 0.2%. Based on these determinations, the MMS application may select an optimal file transmission size of 300 kb. The multimedia file is then divided into chunks, one chunk having a file size equal to the optimal file transmission size of 300 kb. The chunk having a file size equal to the optimal file transmission size of 300 kb is then transmitted over a wireless network. After the 300 kb file chunk is successfully transmitted (or during transmission of the 300 kb chunk), the MMS application determines the file size of the remaining MMS message to send (i.e., the file size of the remaining chunk), the signal to noise ratio and the TCP retransmission rate. Here, the MMS application may determine that the remaining file size is 248 kb (548-300, assuming again that control/header information did not contribute to the transmitted chunk file size), the SNR value is -77 dbm, and the TCP retransmission rate is 0.4%. Based on these determinations, the MMS application may select an optimal file transmission size of 250 kb. Since the remaining file size (248 kb) is less than the optimal file transmission size of 250 kb, the remaining chunk is transmitted over a wireless network. After successfully transmitting the entire multimedia file (or concurrently therewith), various other embodiments may be realized. For example, various network statistics may optionally be sampled and stored (e.g., the wireless communications device may store the TCP retransmission rates, the SNR values, or the like).

Further, additional arrangements of the various components depicted, as well as components not shown, are possible without departing from the spirit and scope of the various embodiments of the invention. Embodiments of the invention are described with the intent to be illustrative rather than restrictive. Alternate embodiments will become apparent to those skilled in the art. A skilled artisan may develop alternate means of implementing the aforementioned improvements without departing from the scope of the various embodiments of the invention. It is understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-usable instructions embodied thereon for performing a method of transmitting files over wireless networks, the method comprising:
receiving a request to transmit a file over a wireless network;
determining a size of the file;
determining a first set of one or more wireless network parameters of the wireless network;
determining an optimal file transmission size based on the first set of one or more wireless network parameters;
dividing the file into a first file chunk having a file size equal to the optimal file transmission size;
transmitting the first file chunk over the wireless network;
receiving an acknowledgement message over the wireless network;
determining a size of a remaining portion of the file;
determining a second set of one or more wireless network parameters of the wireless network;
determining a second optimal file transmission size based on the second set of one or more network parameters;
dividing the remaining portion of the file into a second file chunk having a file size equal to the second optimal file transmission size;
transmitting the second file chunk over the wireless network; and
receiving an acknowledgement message over the wireless network.

2. The media of claim 1, wherein the file comprises a digital photograph or a digital video stored on a wireless communications device.

3. The media of claim 1, wherein determining an optimal file transmission size occurs on a wireless communications device.

4. The media of claim 3, wherein the wireless communications device is a wireless phone.

5. The media of claim 1, wherein transmitting file chunks over the wireless network includes:
generating HTTP POST requests, wherein the HTTP POST requests comprise file chunks in a determined optimal transmission size.

6. The media of claim 1, the method further comprising:
collecting information regarding success or failure of transmitting the file chunks over the wireless network; and
transmitting the collected information over the wireless network to an interested party.

7. The media of claim 1, wherein wireless network parameters are selected from a signal to noise ratio, a transmission control protocol retransmission rate, and a packet error rate.

8. The media of claim 1, wherein determining an optimal transmission size is at least partially based on a payload-to-header ratio.

9. One or more non-transitory computer-readable media having computer-useable instructions embodied thereon for performing a method to send messages, the method comprising:
receiving a request to transmit a multimedia messaging service message over a wireless data network from a wireless communications device;
determining a size of the multimedia messaging service message;
determining a plurality of wireless network parameters;
based on the plurality of wireless network parameters, determining at least one optimal transmission size for the multimedia messaging service message;
generating an HTTP POST request, wherein the HTTP POST request comprises a portion of the multimedia messaging service message in the optimal file transmission size; and
transmitting the multimedia messaging service message over the wireless network in the HTTP POST request.

10. The media of claim 9, wherein the wireless communications device comprises a wireless phone.

11. The media of claim 9, wherein the multimedia messaging service message comprises a photograph or a video captured on a wireless communications device.

12. The media of claim 9, wherein the plurality of wireless network parameters is selected from a signal to noise ratio, transmission control protocol retransmission rate, and a packet error rate.

13. The media of claim 12, wherein determining at least one optimal transmission size for the multimedia messaging service message further comprises a ranking algorithm for assigning the plurality of wireless network parameters a relative importance in determining the at least one optimal file transmission size.

14. The media of claim 9, wherein a plurality of HTTP POST requests are transmitted with each having a corresponding portion of the multimedia messaging service message in the optimal file transmission size such that a receiving component reassembles the corresponding portions upon transmission.

15. The media of claim 14, further comprising:
collecting information regarding the success or failure of transmitting the at least one file chunk over the wireless data network; and
transmitting the collected information over the wireless network to an interested party.

16. A wireless communications device comprising:
a processor;
a storage component that stores a file;
a set of computer-useable instructions embodied in the storage component that, when executed by the processor, provides for
receiving a request to transmit a file over a wireless network;
determining a size of the file;
determining a first set of one or more wireless network parameters of the wireless network;
determining an optimal file transmission size based on the first set of one or more wireless network parameters;
dividing the file into a first file chunk having a file size equal to the optimal file transmission size;
transmitting the first file chunk over the wireless network;
receiving an acknowledgement message over the wireless network;
determining a size of a remaining portion of the file;
determining a second set of one or more wireless network parameters of the wireless network;
determining a second optimal file transmission size based on the second set of one or more network parameters;
dividing the remaining portion of the file into a second file chunk having a file size equal to the second optimal file transmission size; and
a transmitting component that transmits the first file chunk and the second file chunk over the wireless network.

17. The wireless communications device of claim 16, further comprising:
a multimedia capture component for capturing multimedia, wherein the multimedia includes at least one of a digital photograph, a digital video, and an audio file.

18. The wireless communications device of claim 17, wherein the file comprises a multimedia messaging service message.

19. The wireless communications device of claim 18, wherein the plurality of wireless network parameters comprises a signal to noise ratio, a transmission control protocol retransmission rate, and a packet error rate.

20. The media of claim 9, wherein the at least one optimal transmission size is transmitted to the wireless communications device.

\* \* \* \* \*